US009681321B2

(12) United States Patent
Rey et al.

(10) Patent No.: US 9,681,321 B2
(45) Date of Patent: *Jun. 13, 2017

(54) METHOD AND SYSTEM FOR ANALYZING RADIO PERFORMANCE DURING OVER-THE-AIR OPERATION

(71) Applicant: LOCUS LOCATION SYSTEMS, LLC, Melbourne, FL (US)

(72) Inventors: Joseph Rey, Miami, FL (US); John McCarthy, Palm Bay, FL (US); Murad Qahwash, Orlando, FL (US)

(73) Assignee: Locus Location Systems, LLC, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,980

(22) Filed: Nov. 18, 2015

(65) Prior Publication Data
US 2016/0073280 A1    Mar. 10, 2016

Related U.S. Application Data

(63) Continuation of application No. 14/574,196, filed on Dec. 17, 2014, now Pat. No. 9,282,482, which is a (Continued)

(51) Int. Cl.
*H04B 17/00* (2015.01)
*H04W 24/08* (2009.01)
(Continued)

(52) U.S. Cl.
CPC ........ *H04W 24/08* (2013.01); *H04B 17/0057* (2013.01); *H04B 17/17* (2015.01); *H04B 17/318* (2015.01)

(58) Field of Classification Search
CPC .. H04B 17/0057; H04B 17/17; H04B 17/318; H04W 24/08
(Continued)

(56) References Cited

U.S. PATENT DOCUMENTS

| 4,554,410 A | 11/1985 | Furumoto et al. |
| 5,973,643 A | 10/1999 | Hawkes |

(Continued)

OTHER PUBLICATIONS

Written Opinion of the International Searching Authority dated Aug. 3, 2012 for International Application No. PCT/US12/37037.
(Continued)

*Primary Examiner* — Xin Jia
(74) *Attorney, Agent, or Firm* — Mayback & Hoffman, P.A.; Gregory L. Mayback

(57) ABSTRACT

An apparatus for identifying failed or suspect RF transmitting devices while the devices are in normal operation transmitting over-the-air RF signals, each of the RF transmitting devices including an identifier and being mobile, portable or stationary, includes an RF signal sensor receiving the RF signals and responsive thereto, an analyzer, and a GUI. The analyzer measuring signal parameters and determines operating characteristics of a device therefrom, determining the identifier, if each RF signal conforms to packet structure specifications, and bit-field information of each RF signal to discern therefrom a transmission type, measures RF frequency offset, correlates the bit-field information with the RF frequency offset utilizing the identifier; and repeats the last three steps to determine a range of RF frequency offset deviations over time. The GUI displays the range in a form used to identify an RF frequency offset range of the RF transmitting device.

21 Claims, 1 Drawing Sheet

Related U.S. Application Data continuation of application No. 14/024,517, filed on Sep. 11, 2013, now Pat. No. 8,948,022, which is a continuation of application No. 12/882,193, filed on Sep. 14, 2010, now Pat. No. 8,565,096.

(60) Provisional application No. 61/252,693, filed on Oct. 18, 2009.

(51) Int. Cl.
*H04B 17/17* (2015.01)
*H04B 17/318* (2015.01)

(58) Field of Classification Search
USPC .................................................. 455/67.11
See application file for complete search history.

(56) References Cited

U.S. PATENT DOCUMENTS

| | | | |
|---|---|---|---|
| 5,987,306 | A | 11/1999 | Nilsen et al. |
| 6,157,825 | A | 12/2000 | Frederick |
| 6,308,065 | B1 | 10/2001 | Molinari et al. |
| 6,671,291 | B1 | 12/2003 | Soliman |
| 6,745,011 | B1 | 6/2004 | Hendrickson et al. |
| 6,873,601 | B1 | 3/2005 | Chow |
| 6,965,769 | B2 | 11/2005 | Bims et al. |
| 7,346,346 | B2 | 3/2008 | Lipsit |
| 7,881,206 | B2 | 2/2011 | St. Pierre et al. |
| 7,913,182 | B2 | 3/2011 | Bear et al. |
| 8,000,700 | B2 | 8/2011 | Choi et al. |
| 2002/0009992 | A1 | 1/2002 | Jensen |
| 2002/0072359 | A1 | 6/2002 | Moles et al. |
| 2003/0061340 | A1 | 3/2003 | Sun et al. |
| 2004/0032836 | A1 | 2/2004 | Grilli et al. |
| 2004/0142699 | A1 | 7/2004 | Jollota et al. |
| 2004/0203489 | A1 | 10/2004 | Comerford et al. |
| 2006/0003776 | A1 | 1/2006 | Natori et al. |
| 2006/0030270 | A1 | 2/2006 | Cheng |
| 2006/0141998 | A1 | 6/2006 | Kennedy et al. |
| 2006/0205398 | A1 | 9/2006 | Seckendorf et al. |
| 2007/0178843 | A1 | 8/2007 | Singh et al. |
| 2008/0095131 | A1 | 4/2008 | Aljadeff et al. |
| 2008/0113623 | A1 | 5/2008 | Gormley |
| 2008/0146161 | A1 | 6/2008 | Bugenhagen |
| 2008/0201109 | A1 | 8/2008 | Zill et al. |
| 2009/0052330 | A1 | 2/2009 | Matsunaga et al. |
| 2009/0082009 | A1 | 3/2009 | Nagy |
| 2009/0098867 | A1 | 4/2009 | Varanda |
| 2009/0098868 | A1 | 4/2009 | Cheng |
| 2009/0310501 | A1 | 12/2009 | Catovic et al. |
| 2010/0020717 | A1 | 1/2010 | McGregor et al. |
| 2010/0197299 | A1 | 8/2010 | Huber et al. |
| 2010/0254267 | A1 | 10/2010 | Blackwell |
| 2010/0259448 | A1 | 10/2010 | Qahwash et al. |
| 2011/0039520 | A1 | 2/2011 | Maida et al. |
| 2011/0090807 | A1 | 4/2011 | Caudill et al. |

OTHER PUBLICATIONS

Extended European Search Report and European Search Opinion of the European Patent Office dated Oct. 21, 2014, for International Application No. PCT/US2012/37037.

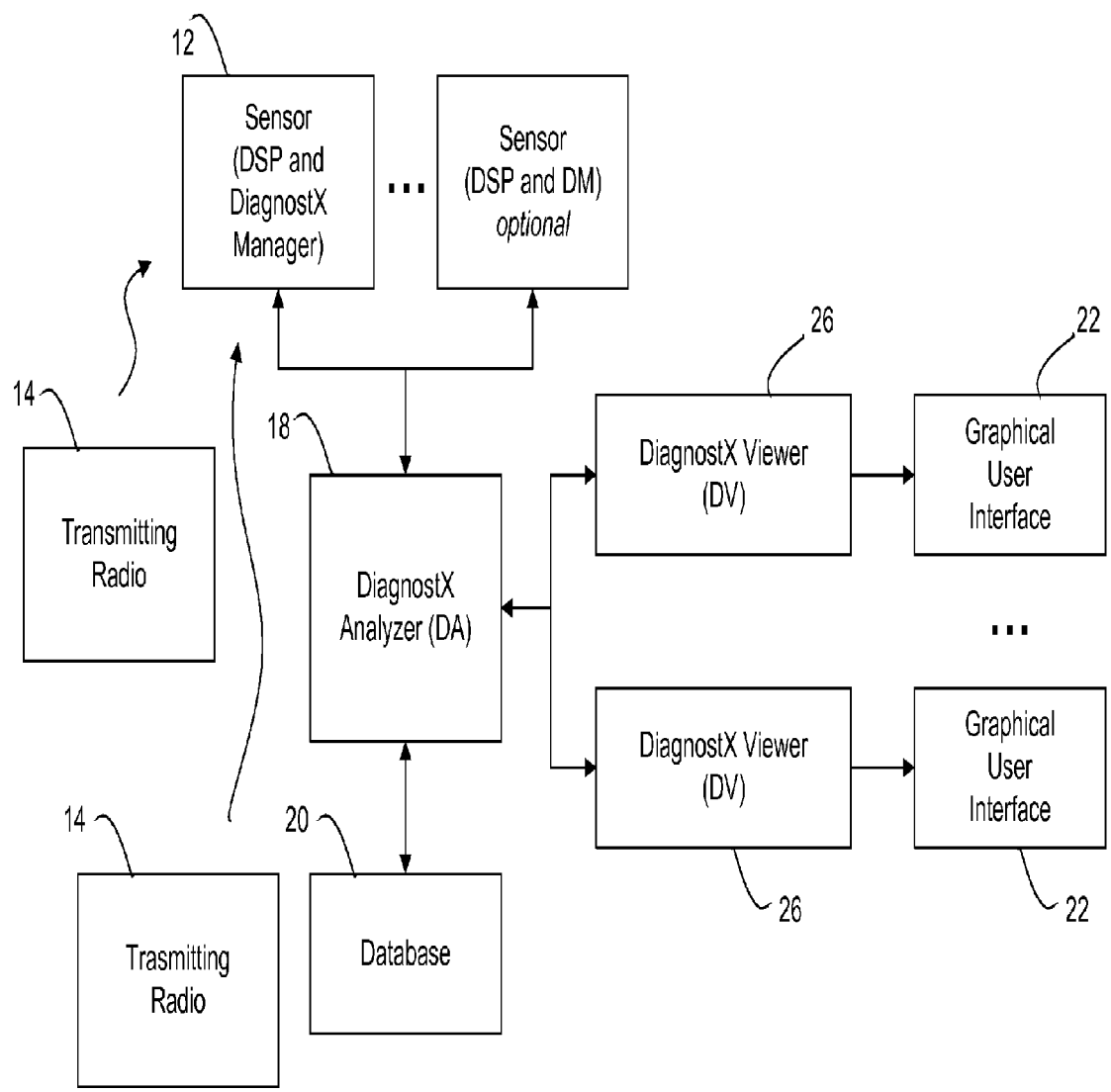

METHOD AND SYSTEM FOR ANALYZING RADIO PERFORMANCE DURING OVER-THE-AIR OPERATION

CROSS-REFERENCE TO RELATED APPLICATIONS

This application is:
a continuation of co-pending U.S. patent application Ser. No. 14/574,196, filed on Dec. 17, 2014, which is a continuation of U.S. patent application Ser. No. 14/024, 517, filed on Sep. 11, 2013, now U.S. Pat. No. 8,948, 022, issued on Feb. 3, 2015, which is a continuation of U.S. patent application Ser. No. 12/882,193, filed on Sep. 14, 2010, now U.S. Pat. No. 8,565,096, issued on Oct. 22, 2013 (which application claimed priority to U.S. patent application Ser. No. 61/252,693 filed on Oct. 18, 2009),
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention lies in the field of electronic communications devices. The present disclosure relates to a method and system for analyzing radio performance during over-the-air operation.

BACKGROUND OF THE INVENTION

The ability of a communications transmitting device to operate according to its specifications is crucial to proper communications between the transmitting device and the receiving device. Often the user does not realize the transmitting device is not operating according to its specification until it fails completely. When the device fails, it must be taken out of service, the problem diagnosed and the device repaired. The present invention overcomes this limitation by advising the user when a specification parameter is not met, although the device may continue to operate within the network at a degraded level.

Thus, a need exists to overcome the problems with the prior art systems, designs, and processes as discussed above.

SUMMARY OF THE INVENTION

The invention provides a method and system for analyzing radio performance during over-the-air operation that overcome the hereinafore-mentioned disadvantages of the heretofore-known devices and methods of this general type.

With the foregoing and other objects in view, there is provided, in accordance with the invention, an apparatus for identifying failed or suspect radio-frequency (RF) transmitting devices while the radio-frequency transmitting devices are in normal operation transmitting over-the-air RF signals, includes at least one RF signal sensor receiving the RF signals from at least one of the RF transmitting devices, each of the RF transmitting devices including an identifier and being mobile, portable or stationary, the at least one RF signal sensor responsive to the received RF signals, an analyzer measuring signal parameters of the received RF signals and determining operating characteristics of at least one of the RF transmitting devices from the signal parameters, determining the identifier within each of the received RF signals, determining if each of the received RF signals conform to packet structure specifications, determining bit-field information of each of the received RF signals and discerning from the bit-field information a type of transmission that has been received from the at least one RF transmitting device, measuring an RF frequency offset of the at least one RF transmitting device, correlating the bit-field information with the RF frequency offset utilizing the identifier, and repeatedly carrying out the bit-field information determining step, the RF frequency offset measuring step and the correlating step to determine a range of RF frequency offset deviations over time, and a graphical user interface displaying the range of RF frequency offset deviations over time in a form that can be used to identify a range of the RF frequency offset of the at least one RF transmitting device.

In accordance with another feature of the invention, the analyzer utilizes the range of RF frequency offset deviations to repair the at least one RF transmitting device.

In accordance with a further feature of the invention, the analyzer utilizes the range of RF frequency offset deviations to generate and send e-mail alerts to users and system operators to repair the at least one RF transmitting device.

In accordance with an added feature of the invention, the analyzer utilizes the range of RF frequency offset deviations to clear the at least one RF transmitting device of all recorded performance measurements and events to restart a collection and evaluation process for the at least one RF transmitting device.

In accordance with an additional feature of the invention, the at least one RF transmitting device contains lists and has data reporting requirements and the analyzer utilizes the range of RF frequency offset deviations to define the contents of any one of the lists and/or the data reporting requirements.

In accordance with yet another feature of the invention, the identifier is at least one of a radio serial number and a radio ID.

In accordance with yet a further feature of the invention, the analyzer uses the identifier from the received RF signals to correlate operating characteristics to a particular one of the transmitting devices.

In accordance with yet an added feature of the invention, the analyzer collects operating characteristics for identified transmitting devices more frequently than operating characteristics for other transmitting devices.

In accordance with yet an additional feature of the invention, the graphical user interface displays the operating characteristics for each transmitting device.

In accordance with again another feature of the invention, the analyzer determines RF frequency characteristics of the received RF signals from the at least one transmitting device, determines the respective identifier of the at least one transmitting device from the received RF signals, and uses the identifier from the received RF signals to correlate at least one of the RF frequency characteristics and the bit-field information of the particular one of the transmitting devices, and the graphical user interface displays at least one of the RF frequency characteristics and the bit-field information in a form that can be used to identify transmitting devices that have failed and transmitting devices that are suspect.

In accordance with again a further feature of the invention, the RF frequency characteristics are selected from RF frequency accuracy of the received RF signals, RF frequency offset of the received RF signals, a timing of a RF frequency offset of the received RF signals, a RF frequency offset of the received RF signals relative to a beginning of a message, a RF frequency offset of the received RF signals throughout a message, a frequency deviation of the received RF signals, a range of frequency deviations of the received RF signals over time; and/or a maximum frequency deviation of the received RF signals, the analyzer uses the identifier from the received RF signals to correlate the RF frequency characteristics to the particular one of the transmitting devices, and the graphical user interface displays the RF frequency characteristics in a form that can be used to identify transmitting devices that have failed and transmitting devices that are suspect.

In accordance with again an added feature of the invention, the analyzer measures signal parameters of received RF signals and determines operating characteristics of the transmitting devices from the signal parameters and uses the identifier from the received RF signals to correlate the operating characteristics to the particular one of the transmitting devices.

In accordance with again an additional feature of the invention, the graphical user interface displays the operating characteristics for each transmitting device.

In accordance with still another feature of the invention, the analyzer further determines transmitting devices satisfying predefined operating thresholds, transmitting devices satisfying specifications applicable to the transmitting device, suspect transmitting devices, transmitting devices transmitting a signal having an RSSI below a predetermined threshold, transmitting devices transmitting a signal having an RSSI below the specification applicable to the transmitting device, transmitting devices having an insufficient number of transmissions from which to determine operating characteristics of the transmitting device, transmitting devices not in regular use, and/or transmitting device reports according to user-defined topics.

In accordance with still a further feature of the invention, the signal parameters comprise at least one of RF frequency accuracy, RF frequency offset from an assigned frequency, timing of RF frequency offsets relative to a beginning of a message transmission, RF frequency offset variations throughout a message transmission, frequency deviation of the modulated signal, range of frequency deviations over time, amplitude variations during a message transmission, symbol frequency error, symbol clock error, modulation fidelity, bit error rate, conformance to packet structure specifications, baud rate changes during a message transmission, spurious emissions, RSSI, consistent low power level irrespective of location of the transmitting device, high bit error rate irrespective of location of the transmitting device, battery charge, a number of retries over a predetermined threshold, and unexpectedly low RSSI.

In accordance with still an added feature of the invention, the analyzer comprises a storage time parameter identifying a period of time for storing the operating characteristics and a data collection frequency parameter identifying a frequency at which the operating characteristics are determined, the analyzer includes a list of the identifiers of transmitting devices for which signal parameters are to be determined, and frequency of monitoring and analyzing the signal parameters is user-defined for each transmitting device.

In accordance with still an additional feature of the invention, the transmitting device comprises a transmitting device operating in a trunked radio network, the analyzer monitors at least one of a request from the transmitting device to a network controller for an inbound channel, a message from the network controller advising the transmitting device of an assigned inbound channel, and an inbound channel carrying transmissions from the transmitting device, the analyzer operates in conjunction with a location-determining system determining a location of the transmitting devices in the trunked radio network, and the analyzer advises the location-determining system of the performance of the transmitting devices in the trunked radio network.

In accordance with another feature of the invention, the transmitting device comprises a mobile or portable transmitting device or a mobile or portable transceiver and the transmitting device is operative in a communications network selected from at least one of a WiFi network, a trunked transmitting device network, a cellular telephone network, a paging network, a WiMax network, an 802.11x network, and a Zigbee network.

In accordance with another feature of the invention, the at least one RF signal sensor comprises at least one antenna, a receiver, a digital signal processor, a precision oscillator and a general purpose processor cooperating to measure signal parameters of the RF signals from which the operating characteristics of the transmitting device are determined.

In accordance with still another feature of the invention, the analyzer determines a "health" of at least one of the transmitting devices by comparing the operating characteristics of the at least one transmitting device with performance specifications for the at least one transmitting device and/or governmental regulations applicable to performance of the at least one transmitting device.

In accordance with a concomitant feature of the invention, there is provided a database storing information related to the operating characteristics, the information comprising one or more of statistics related to the operating characteristics for a transmitting device, past repair dates for a transmitting device, transmitting devices for which no operating characteristics have been determined, and user-defined information, storing at least one of the RF frequency characteristics and the bit-field information, and from which the operating characteristics and the at least one of the RF frequency characteristics and the bit-field information for a transmitting device are deleted after the transmitting device is repaired.

Although the invention is illustrated and described herein as embodied in a method and system for analyzing radio performance during over-the-air operation, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

The FIGURE is a block diagram of the system of the present invention.

In accordance with common practice, the various described features are not drawn to scale, but are drawn to emphasize specific features relevant to the invention Like reference characters denote like elements throughout the figures and text.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant FIGURE.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Before describing in detail the particular method and system for analyzing performance of a radio or transmitting device during over-the-air operation according to the present invention, it should be observed that the present invention resides in a novel and non-obvious combination of structural elements and method steps. Accordingly, these elements have been represented by conventional elements and steps in the drawings and specification. The elements and process steps conventionally known in the art are described in lesser detail, and elements and steps pertinent to understanding the invention are described in greater detail. The following preferred embodiments are an application of the present invention and are not intended to define limits of the structure or use of the invention, but only to provide exemplary constructions. Many variations can be made to the design within the scope of the presented claims.

The present invention determines the "health" of a transmitting device (e.g., a mobile, portable or stationary transmitter or transceiver) that emits a radio frequency signal for receiving by a receiving device (e.g., a receiver, a transceiver), including transmitting and receiving devices operating in a network. The network may include, but is not limited to, a WiFi network, a trunked radio network, a cellular telephone network, a paging network, a WiMax network, an 802.11x network and a Zigbee network. The teachings of the invention can be applied to transmitting and receiving devices operating in digital and analog networks (where the analog networks include such devices as conventional two-way radios and AM or FM transmitters).

The "health" of each device, which is important to ensure that a user can effectively communicate with others in the network, is determined while the device is in an over-the-air operating mode. Bench tests for transmitting devices are known in the repair art. Unlike the known art, the present invention does not require removing the device from active service to evaluate the "health" of the device. Instead, the present invention allows a network operator or a device user to assess the "health" of the device during normal operation.

When used in the present application, the "health" of a device refers to its performance in accordance with applicable performance specifications as determined by the device manufacturer or as determined by the user or network provider. That is, the network provider may require tighter tolerances for certain operational parameters due to the characteristics of its network.

A failed component or other element of the device may degrade its performance and/or cause its parameters to vary from the specification values. A significant degradation or a significant variation from the specification may prevent the device from communicating with other devices on the network. According to the present invention, the transmitting devices are tested during over-the-air operation and any variance from the applicable specifications is identified. The device can then be removed from service for repair.

As used herein the term "radio" refers to any transceiver (or transmitter) transmitting or transmitting and receiving RF signals. Mobile and portable transceivers used in public safety trunked networks are commonly referred to as radios.

One application of the present invention applies to radios operating in a trunked radio system that includes a location-determining subsystem for determining the location of any transmitting radio. In this application, the "health" of each radio is important to accurately locate the radio and its operator.

The teachings of the invention can be employed by a network operator to determine the "health" of transmitting devices operating within its network or the "health" of a transmitting device can be determined irrespective of any network in which the transmitting device operates. Use of the system of the invention can identify incipient and real-time transmitting device problems to reduce both transmitting device and network downtime, improve the "health" of the network, increase network capacity and improve other aspects of network performance (e.g., location accuracy for a transmitting device operating in a radio-location system).

To identify incipient problems, the user (or network operator) can set a relatively tight tolerance for transmitting device operation; any performance parameters outside this range, while not indicative of a failure, may be evidence of a potential problem. Thus parameters outside the user-defined range may trigger an incipient problem alert.

The invention can also determine whether a transmitting device is operating according to pertinent regulations promulgated by a regulatory agency, such as the U.S. Federal Communication Commission or similar regulatory agencies of other countries. These regulations dictate the operating requirements of both licensed and unlicensed transmitting devices. The invention can also determine if a transmitting device operates within its published specifications, apart from any applicable government regulations.

The system and method of the present invention (commercially referred to as a DiagnostX System) is a field diagnostic tool that verifies and/or determines the "health" of transmitting devices using over-the-air transmissions from the transmitting devices. For example, when a radio in a trunked radio network transmits (on an inbound channel), a request for a working channel (i.e., the channel or frequency for carrying a subsequent communication with another radio in the network) to a network controller, the system of the invention captures the transmitted waveform on the inbound channel and analyzes the waveform for possible failures, problems or out-of-spec parameters. The system can also listen to the outbound control channel (over which the radio is advised to a working channel by the network controller) and follow the radio to its assigned working channel to capture and analyze working channel transmissions.

The system of the present invention captures inbound and outbound control channel signals and working channel signals to measure operational characteristics of the radio when operating in a transmitting mode and to detect potential radio transmission problems. The trunked radio system operator can remove the radio from service for repair or undertake other maintenance actions as deemed advisable. The signal measurement and analysis features of the invention are intended to reduce radio failures in the field and to identify suspect radios before they fail. When used in conjunction with a location-determining system, the present invention also improves the accuracy of the determined locations by ensuring that each radio is operating according to its specifications. As applied to the trunked radio system, a better operating radio can also reduce the number of control channel retries and therefore increase the system throughput or capacity.

Generally, one parameter determined by the system of the invention is a received signal strength indicator (RSSI) value. This value must exceed a minimum RSSI to permit meaningful analysis of the signal parameters and transmitter operating characteristics as determined by the present invention. In one embodiment the minimum value is −95 dBm. Signals with RSSI values less than −95 dBm can be ignored or if analyzed can be notated with an indication that the RSSI value was below the required minimum value.

To set up the radio diagnostic system, an identifier for each radio is entered into the database. The operating characteristics or parameters are also entered manually or selected from a presented menu. These specifications for individual radios are determined by the operating for that radio, e.g., transmission type, protocol type. For example, each protocol may have a different specification and a different range of permitted deviations from that specification. Further, a first specification range may be established to identify potential problem radios. An operational parameter within the first range indicates a suspect radio. A second specification range may be established to identify failed radios. An operational parameter within the second range indicates a failed radio that should be immediately removed from service for repair.

Described now are exemplary embodiments of the present invention. Referring now to the FIGURE of the drawing in detail and, in particular, to FIG. 1, there is shown a block diagram of a first exemplary embodiment of the system of the invention. The system includes one or more signal sensors (referred to as a DSP and DiagnostX Manager (DM)

in the FIGURE) 12 that receive RF signals from transmitting radios 14 and measures characteristics of the signal to extract desired operational metrics or operating characteristics of that radio. In one embodiment of the invention, each receiving site or sensor in a network employs at least one directional antenna or a plurality of antennas that provide diversity reception and may thereby increase a signal strength of a received signal. Each sensor further includes, in an addition to the at least one antenna, a receiver, a digital signal processor, a precision oscillator and a general purpose processor. These devices cooperate, under control of the processor, to measure various signal parameters of the transmitted signal as required to extract the transmitter operating characteristics, as identified below.

An identifier associated with each radio and included in each signal transmitted by that radio is used to link the determined transmitter operating characteristics to the transmitting radio.

A database 20 stores the radio identifiers for radios to be monitored (and in one embodiment a list of identifiers for radios that are not to be monitored). The database 20 stores the pertinent specifications, desired operating characteristics and specifications ranges for each radio. The database also stores the actual operating characteristics for each radio, where the actual operating characteristics are determined from the signals transmitted from the pertinent radio as those signals are received and analyzed by the system of the present invention.

The sensor measurements are input to a DiagnostX Analyzer (DA) 18 that performs calculations and determines whether the signal measurements indicate that one or more operating characteristics of the radio exceed the pertinent specification ranges for that radio. When certain ranges are exceeded the radio may be flagged as suspect and when other ranges are exceeded this may warrant flagging the radio as failed.

Results from the DA 18 are displayed on a graphical user interface (GUI) 22 under control of a DiagnostX Viewer (DV) 26 that pulls data for the GUI 22 from the DA 18 and the database 20. For example, the GUI 22 may display a radio identifier and signal measurements associated with the identified radio. The system can also identify (highlight) and display pertinent information for any radio with potential or incipient problems, including a general textual description of the problem.

From the DA 18, the analysis results are also stored in the database 20 for later retrieval and/or additional analysis. The database 20 can be searched by radio identification number to retrieve performance data for selected radios.

After a radio has been repaired, the collected performance parameters can be cleared from the database 20 as they are no longer relevant after radio repair.

The system can also target specific radios for additional and more detailed over-the-air or bench analysis. Such radios can also be identified in the database 20. In one embodiment, performance data for the targeted radios can be collected more frequently than the other radios in the database.

The system generates, displays, and prints numerous reports including but not limited to:

Good radios, i.e., those that satisfy predefined operating thresholds or satisfy associated specifications
Suspect radios as determined from standard industry conformance testing and operational specifications
Radios emitting a weak signal, where weak is defined as an RSSI below a predetermined threshold or below the specification for the associated radio.
Radios with an insufficient number of transmissions to permit an accurate determination of the radio's health.
Radios not in regular use
Other reports according to user-defined subject matter
Waveform visualization
Bit-field visualization (i.e. a packet sniffer)

An analysis of the received signal and its waveform provides information on the operational aspects of each radio, including but not limited to the following operational attributes.

RF frequency accuracy
RF frequency offset (i.e., offset from an assigned frequency)
Timing of RF frequency offsets relative to a beginning of a message
RF frequency offset variations throughout a message
Frequency deviation of the modulated signal (i.e., the difference between the center frequency of the received signal and the modulated frequency)
Range of frequency deviations over time
Maximum frequency deviation
Unexpected amplitude variations during a message
Symbol Frequency Error
Symbol Clock Error
Modulation Fidelity
Bit Error Rate
Conformance to packet structure specifications
Baud rate changes during a message
Spurious emissions
Received signal strength indicator (RSSI)
Consistent low power level irrespective of radio location
High bit error rate irrespective of radio location
Battery charge
Probable emission mask non compliance
Communication retries that exceed a user-defined threshold (as applied to a trunked network). This parameter can also be determined with respect to a specific receiving site in a trunked network, i.e., whether a specific site on the network is experiencing a substantial number of retries.
An unexpectedly low received signal strength based on the location of the radio and the location of the receiving sensor To assist with the analysis of each radio, the operator can define different operational metric thresholds (e.g., frequency offset, frequency deviation) for one or more radios by reference to the radio identifier. This feature thus allows different thresholds to be established for different radios in the network. The system can also rank the radios from those with the best performance to those with the worst.

A radio exhibiting an operating measurement that exceeds a threshold is indicated on the GUI 22. These radios may be classified as suspect or failed. In one embodiment the number of analyzed transmissions and the time period over which the data is collected must satisfy minimum thresholds before the radio can be identified as suspect or failed.

The system operator can also determine and configure the system with the length of time the historical operational data is stored (e.g., a storage time parameter such as last year, last six months, etc.), the frequency at which the performance data is collected (e.g., one daily performance snapshot, weekly, monthly) and the performance data measured during each snapshot.

The system can generate and send e-mail alerts to users and system operators. For example, each morning an email listing the worst performing or suspect radios can be sent to system operators or to the user of each listed transmitting device. The users of the listed radios and the system operators should consider these radios when communicating with or trying to locate any of the listed radios. The alert criteria are also user-defined (e.g., frequency of emails, email distribution list).

If the system operator is interested in the performance of only a subset of the radios, the operator generates a list of the radios and configures the system to monitor the performance of only the listed radios.

The system can also store and display:
A minimum RSSI threshold (e.g., −95 dBm or greater) before operational data is collected
A median calculation on the collected data to statistically eliminate any outliers for a radio.
Radio repair dates tied to a radio identifier (preferably a radio serial number or another unique radio identifier). A repair technician enters the radio identifier into the system before beginning the repair and a system-generated date is used as the repair date. When a repair date is entered the historical performance data and all radio transmissions are cleared
A suspect radio can be cleared of all recorded performance measurements and events to restart the collection and evaluation process for the radio. The system-generated date/time is used as the "clear" date
Store the previous n performance data measurements for every radio
Maintain lists and pertinent data that indicate the health of each radio according to the parameters that the user or system operator defines for a suspect, failed and a properly operating radio. For example, the lists can indicate a radio always transmitting signals below a user-defined RSSI threshold, above a user-defined threshold but based on fewer than n measurements, and a subjective judgment as to the radio's health (e.g., good or suspect) and the metrics on which the judgment is based. The user or system operator can also define the contents of any list and data reporting requirements for any radio.
Generate or use an operator-provided list of radio identification information that identifies radios for which performance data has not been collected
Ensure the radios meet FCC mandated performance requirements
Install software updates or synthetic instrumentation via an Internet connection or manually from a CD or USB drive When a signal from a radio is detected (referred to as an event), radio identification information, date and time information, and measured operational characteristics for that radio are determined and stored. The operational parameters are analyzed to determine the "health" of the radio. Tracking the time the event is recorded allows the system to time-align events if multiple sensors are used to record the radio performance data.

The system can track radios by serial number, radio ID, or another unique identifier. This is useful in systems where radios are reconfigured with different identifiers because it allows all historical performance information to link to the same physical radio.

In one embodiment, after a location of the radio is determined, by a radio-location system separate from the diagnosis system of the invention, the RSSI value can be used as one parameter to assess the "health" of the radio. Other parameters that are location-dependent can also be used once the location has been determined.

Although the invention has been shown and described with respect to a certain preferred embodiment or embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing FIGURE or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An apparatus for identifying failed or suspect radio-frequency (RF) transmitting devices while the RF transmitting devices are in normal operation transmitting over-the-air RF signals, the apparatus comprising:
at least one RF signal sensor receiving the RF signals from at least one of the RF transmitting devices, each of the RF transmitting devices including an identifier and being mobile, portable or stationary, the at least one RF signal sensor responsive to the received RF signals;
an analyzer:
measuring signal parameters of the received RF signals and determining operating characteristics of at least one of the RF transmitting devices from the signal parameters;
determining the identifier within each of the received RF signals;

determining if each of the received RF signals conform to packet structure specifications;

determining bit-field information of each of the received RF signals and discerning from the bit-field information a type of transmission that has been received from the at least one RF transmitting device;

measuring an RF frequency offset of the at least one RF transmitting device;

correlating the bit-field information with the RF frequency offset utilizing the identifier; and repeatedly carrying out the bit-field information determining step, the RF frequency offset measuring step and the correlating step to determine a range of RF frequency offset deviations over time; and a graphical user interface displaying the range of RF frequency offset deviations over time in a form that can be used to identify a range of the RF frequency offset of the at least one RF transmitting device.

2. The apparatus according to claim 1, wherein the analyzer utilizes the range of RF frequency offset deviations to repair the at least one RF transmitting device.

3. The apparatus according to claim 1, wherein the analyzer utilizes the range of RF frequency offset deviations to generate and send e-mail alerts to users and system operators to repair the at least one RF transmitting device.

4. The apparatus according to claim 1, wherein the analyzer utilizes the range of RF frequency offset deviations to clear the at least one RF transmitting device of all recorded performance measurements and events to restart a collection and evaluation process for the at least one RF transmitting device.

5. The apparatus according to claim 1, wherein:
the at least one RF transmitting device contains lists and has data reporting requirements; and
the analyzer utilizes the range of RF frequency offset deviations to define at least one of:
the contents of any one of the lists; and
the data reporting requirements.

6. The apparatus according to claim 1, wherein the identifier is at least one of a radio serial number and a radio ID.

7. The apparatus according to claim 1, wherein the analyzer uses the identifier from the received RF signals to correlate operating characteristics to a particular one of the transmitting devices.

8. The apparatus according to claim 1, wherein the analyzer collects operating characteristics for identified transmitting devices more frequently than operating characteristics for other transmitting devices.

9. The apparatus according to claim 1, wherein the graphical user interface displays the operating characteristics for each transmitting device.

10. The apparatus according to claim 1, wherein:
the analyzer:
determines RF frequency characteristics of the received RF signals from the at least one transmitting device;
determines the respective identifier of the at least one transmitting device from the received RF signals; and
uses the identifier from the received RF signals to correlate at least one of the RF frequency characteristics and the bit-field information of the particular one of the transmitting devices; and
the graphical user interface displays at least one of the RF frequency characteristics and the bit-field information in a form that can be used to identify transmitting devices that have failed and transmitting devices that are suspect.

11. The apparatus according to claim 10, wherein:
the RF frequency characteristics are selected from at least one of:
RF frequency accuracy of the received RF signals;
RF frequency offset of the received RF signals;
a timing of a RF frequency offset of the received RF signals;
a RF frequency offset of the received RF signals relative to a beginning of a message;
a RF frequency offset of the received RF signals throughout a message;
a frequency deviation of the received RF signals;
a range of frequency deviations of the received RF signals over time; and
a maximum frequency deviation of the received RF signals;
the analyzer uses the identifier from the received RF signals to correlate the RF frequency characteristics to the particular one of the transmitting devices; and
the graphical user interface displays the RF frequency characteristics in a form that can be used to identify transmitting devices that have failed and transmitting devices that are suspect.

12. The apparatus according to claim 1, wherein the analyzer:
measures signal parameters of received RF signals and determines operating characteristics of the transmitting devices from the signal parameters; and
uses the identifier from the received RF signals to correlate the operating characteristics to the particular one of the transmitting devices.

13. The apparatus according to claim 12, wherein the graphical user interface displays the operating characteristics for each transmitting device.

14. The apparatus according to claim 12, wherein the analyzer further determines one or more:
transmitting devices satisfying predefined operating thresholds;
transmitting devices satisfying specifications applicable to the transmitting device;
suspect transmitting devices;
transmitting devices transmitting a signal having an RSSI below a predetermined threshold;
transmitting devices transmitting a signal having an RSSI below the specification applicable to the transmitting device;
transmitting devices having an insufficient number of transmissions from which to determine operating characteristics of the transmitting device;
transmitting devices not in regular use; and
transmitting device reports according to user-defined topics.

15. The apparatus according to claim 12, wherein the signal parameters comprise at least one of RF frequency accuracy, RF frequency offset from an assigned frequency, timing of RF frequency offsets relative to a beginning of a message transmission, RF frequency offset variations throughout a message transmission, frequency deviation of a modulated signal, range of frequency deviations over time, amplitude variations during a message transmission, symbol frequency error, symbol clock error, modulation fidelity, bit error rate, conformance to packet structure specifications, baud rate changes during a message transmission, spurious emissions, RSSI, consistent low power level irrespective of location of the transmitting device, high bit error rate irrespective of location of the transmitting device, battery charge, a number of retries over a predetermined threshold, and unexpectedly low RSSI.

16. The apparatus according to claim 12, wherein:
the analyzer comprises:
  a storage time parameter identifying a period of time for storing the operating characteristics; and
  a data collection frequency parameter identifying a frequency at which the operating characteristics are determined;
the analyzer includes a list of the identifiers of transmitting devices for which signal parameters are to be determined; and
frequency of monitoring and analyzing the signal parameters is user-defined for each transmitting device.

17. The apparatus according to claim 12, wherein:
the transmitting device comprises a transmitting device operating in a trunked radio network;
the analyzer monitors at least one of a request from the transmitting device to a network controller for an inbound channel, a message from the network controller advising the transmitting device of an assigned inbound channel, and an inbound channel carrying transmissions from the transmitting device;
the analyzer operates in conjunction with a location-determining system determining a location of the transmitting devices in the trunked radio network; and
the analyzer advises the location-determining system of the performance of the transmitting devices in the trunked radio network.

18. The apparatus according to claim 12, wherein:
the transmitting device comprises a mobile or portable transmitting device or a mobile or portable transceiver; and
the transmitting device is operative in a communications network selected from at least one of a WiFi network, a trunked transmitting device network, a cellular telephone network, a paging network, a WiMax network, an 802.11x network, and a Zigbee network.

19. The apparatus according to claim 12, wherein the at least one RF signal sensor comprises at least one antenna, a receiver, a digital signal processor, a precision oscillator and a general purpose processor cooperating to measure signal parameters of the RF signals from which the operating characteristics of the transmitting device are determined.

20. The apparatus according to claim 12, wherein the analyzer determines a "health" of at least one of the transmitting devices by comparing the operating characteristics of the at least one transmitting device with at least one of:
performance specifications for the at least one transmitting device; and
governmental regulations applicable to performance of the at least one transmitting device.

21. The apparatus according to claim 12, which further comprises a database:
storing information related to the operating characteristics, the information comprising one or more of statistics related to the operating characteristics for a transmitting device, past repair dates for a transmitting device, transmitting devices for which no operating characteristics have been determined, and user-defined information;
storing at least one of the RF frequency characteristics and the bit-field information; and
from which the operating characteristics and the at least one of the RF frequency characteristics and the bit-field information for a transmitting device are deleted after the transmitting device is repaired.

\* \* \* \* \*